(12) United States Patent
Ranasinghe et al.

(10) Patent No.: US 6,389,794 B2
(45) Date of Patent: May 21, 2002

(54) METHOD AND APPARATUS FOR FUEL GAS MOISTURIZATION AND HEATING

(75) Inventors: Jatila Ranasinghe, Niskayuna; Raub Warfield Smith, Ballston Lake, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/829,437

(22) Filed: Apr. 10, 2001

Related U.S. Application Data (63) Continuation of application No. 09/340,510, filed on Jul. 1, 1999, now abandoned.

(51) Int. Cl.[7] ................................................. F02G 3/00
(52) U.S. Cl. .................. 60/39.05; 60/39.182; 60/39.59; 60/736
(58) Field of Search ............................. 60/39.182, 736, 60/34.59, 39.05

(56) References Cited

U.S. PATENT DOCUMENTS

| | | |
|---|---|---|
| 4,753,068 A | 6/1988 | El-Masri |
| 5,170,622 A | 12/1992 | Cheng |
| 5,233,826 A | 8/1993 | Cheng |
| 5,295,351 A | 3/1994 | Rathbone |
| 5,450,821 A | 9/1995 | Kalina |
| 5,544,479 A | 8/1996 | Yan et al. |
| 5,577,377 A | 11/1996 | Tomlinson |
| 5,628,179 A | 5/1997 | Tomlinson |
| 5,867,977 A | 2/1999 | Zachary |

FOREIGN PATENT DOCUMENTS

| | | |
|---|---|---|
| JP | 10-131716 | 5/1998 |
| JP | 10-131717 | 5/1998 |
| JP | 10-131718 | 5/1998 |
| JP | 10-131719 | 5/1998 |

OTHER PUBLICATIONS

"39th GE Turbine State–of–the–Art Technology Seminar", Tab 1, "'F' Technology—the First Half–Million Operating Hours", H.E. Miller.
"39th GE Turbine State–of–the–Are Technology Seminar", Tab 2, "GE Heavy–Duty Gas Turbine Performance Characteristics", F. J. Brooks.
"39th GE Turbine State–of–the–Art Technology Seminar", Tab 3, "9EC 50Hz 170–MW Class Gas Turbine", A. S. Arrao.
"39th GE Turbine State–of–the–Art Technology Seminar", Tab 4, "MWS6001FA—An Advanced–Technology 70–MW Class 50/60 Hz Gas Turbine", Ramachandran et al.
"39th GE Turbine State–of–the–Art Technology Seminar", Tab 5, "Turbomachinery Technology Advances at Nuovo Pignone", Benvenuti et al.
"39th GE Turbine State–of–the–Art Technology Seminar", Tab 6, "GE Aeroderivative Gas Turbines—Design and Operating Features", M.W. Horner.

(List continued on next page.)

*Primary Examiner*—Charles G. Freay
*Assistant Examiner*—Ehud Gartenberg
(74) *Attorney, Agent, or Firm*—Nixon & Vanderhye PC (57) ABSTRACT

Fuel gas is saturated with water heated with a heat recovery steam generator heat source. The heat source is preferably a water heating section downstream of the lower pressure evaporator to provide better temperature matching between the hot and cold heat exchange streams in that portion of the heat recovery steam generator. The increased gas mass flow due to the addition of moisture results in increased power output from the gas and steam turbines. Fuel gas saturation is followed by superheating the fuel, preferably with bottom cycle heat sources, resulting in a larger thermal efficiency gain compared to current fuel heating methods. There is a gain in power output compared to no fuel heating, even when heating the fuel to above the LP steam temperature.

24 Claims, 7 Drawing Sheets

OTHER PUBLICATIONS

"39th GE Turbine State–of–the–Art Technology Seminar", Tab 7, "Advances Gas Turbine Materials and Coatings", P.W. Schilke.

"39th GE Turbine State–of–the–Art Technology Seminar", Tab 8, "Dry Low $NO_x$ Combustion Systems for GE Heavy–Duty Turbines", L.B. Davis.

"39th GE Turbine State–of–the–Art Technology Seminar", Tab 9, "GE Gas Turbine Combustion Flexibility", M. A. Davi.

"39th GE Turbine State–of–the–Art Technology Seminar", Tab 10, "Gas Fuel Clean–Up System Design Considerations for GE Heavy–Duty Gas Turbines", C. Wilkes.

"39th GE Turbine State–of–the–Art Technology Seminar", Tab 11, "Integrated Control Systems for Advanced Combined Cycles", Chu et al.

"39th GE Turbine State–of–the–Art Technology Seminar", Tab 12, "Power Systems for the 21st Century "H" Gas Turbine Combined Cycles", Paul et al.

"39th GE Turbine State–of–the–Art Technology Seminar", Tab 13, "Clean Coal and Heavy Oil Technologies for Gas Turbines", D. M. Todd.

"39th GE Turbine State–of–the–Art Technology Seminar", Tab 14, "Gas Turbine Conversions, Modifications and Uprates Technology", Stuck et al.

"39th GE Turbine State–of–the–Art Technology Seminar", Tab 15, "Performance and Reliability Improvements for Heavy–Duty Gas Turbines," J. R. Johnston.

"39th GE Turbine State–of–the–Art Technology Seminar", Tab 16, "Gas Turbine Repair Technology", Crimi et al.

"39th GE Turbine State–of–the–Art Technology Seminar", Tab 17, "Heavy Duty Turbine Operating & Maintenance Considerations", R. F. Hoeft.

"39th GE Turbine State–of–the–Art Technology Seminar", Tab 18, "Gas Turbine Performance Monitoring and Testing", Schmitt et al.

"39th GE Turbine State–of–the–Art Technology Seminar", Tab 19, "Monitoring Service Delivery System and Diagnostics", Madei et al.

"39th GE Turbine State–of–the–Art Technology Seminar", Tab 20, "Steam Turbines for Large Power Applications", Reinker et al.

"39th GE Turbine State–of–the–Art Technology Seminar", Tab 21, "Steam Turbines for Ultrasupercritical Power Plants", Retzlaff et al.

"39th GE Turbine State–of–the–Art Technology Seminar", Tab 22, "Steam Turbine Sustained Efficiency", P. Schofield.

"39th GE Turbine State–of–the–Art Technology Seminar", Tab 23, "Recent Advances in Steam Turbines for Industrial and Cogeneration Applications", Leger et al.

"39th GE Turbine State–of–the–Art Technology Seminar", Tab 24, "Mechanical Drive Steam Turbines", D. R. Leger.

"39th GE Turbine State–of–the–Art Technology Seminar", Tab 25, "Steam Turbines for STAG™ Combined–Cycle Power Systems", M. Boss.

"39th GE Turbine State–of–the–Art Technology Seminar", Tab 26, "Cogeneration Application Considerations", Fisk et al.

"39th GE Turbine State–of–the–Art Technology Seminar", Tab 27, "Performance and Economic Considerations of Repowering Steam Power Plants", Stoll et al.

"39th GE Turbine State–of–the–Art Technology Seminar", Tab 28, "High–Power–Density™ Steam Turbine Design Evolution", J. H. Moore.

"39th GE Turbine State–of–the–Art Technology Seminar", Tab 29, "Advances in Steam Path Technologies", Cofer, IV, et al.

"39th GE Turbine State–of–the–Art Technology Seminar", Tab 30, "Upgradable Opportunities for Steam Turbines", D. R. Dreier, Jr.

"39th GE Turbine State–of–the–Art Technology Seminar", Tab 31, "Uprate Options for Industrial Turbines", R. C. Beck.

"39th GE Turbine State–of–the–Art Technology Seminar", Tab 32, "Thermal Performance Evaluation and Assessment of Steam Turbine Units", P. Albert.

"39th GE Turbine State–of–the–Art Technology Seminar", Tab 33, "Advances in Welding Repair Technology" J. F. Nolan.

"39th GE Turbine State–of–the–Art Technologh Seminar", Tab 34, "Operation and Maintenance Strategies to Enhance Plant Profitability", MacGillivray et al.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al.

"39th GE Turbine State–of–the–Art Technology Seminar", Tab 37, "GE Combined Cycle Product Line and Performance", Chase, et al.

"39th GE Turbine State–of–the–Art Technology Seminar", Tab 38, "GE Combined Cycle Experience", Maslak et al..

"39th GE Turbine State–of–the–Art Technology Seminar", Tab 39, "Single–Shaft Combined Cycle Power Generation Systems", Tomlinson et al.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced 'H' Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR 15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3.

"Proceedings of the Advanced Turbine Systems Annaul Program Review Meeting", vol. I, "H Gas Turbine Combined Cycle", J. Corman, p. 14.

"Proceedings of the Advanced Turbine Systems Annaul Program Review Meeting", vol. I, "Overview of Westinghouse's Advanced Turbine Systems Program", Bannister et al., p. 22.

"Proceedings of the Advanced Turbine Systems Annual Program Review Meeting", vol. I, "Allison Engine ATS Program Technical Review", D. Mukavetz, p. 31.

"Proceedings of the Advanced Turbine Systems Annaul Program Review Meeting", vol I, "Advanced Turbine Systems Program Industrial System Concept Development", S. Gates, p. 43.

"Proceedings of the Advanced Turbine Systems Annual Program Review Meeting", vol. I, "Advanced Turbine System Program Phase 2 Cycle Selection", Latcovich, Jr., p. 64.

"Proceedings of the Advanced Turbine Systems Annaul Program Review Meeting", vol. I, "General Electric ATS Program Technical Review Phase 2 Activities", Chance et al., p. 70.

"Proceedings of the Advanced Turbine Systems Annaul Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.

"Proceedings of the Advanced Turbine Systems Annaul Program Review Meeting", vol. I, "Advanced Turbine Systems Annual Program Review", William E. Koop, p. 89.

"Proceedings of the Advanced Turbine Systems Annual Program Review Meeting", vol. I, "The AGTSR Consortium: An Update", Fant et al., p. 93.

"Proceedings of the Advanced Turbine Systems Annual Program Review Meeting", vol. I, "Overview of Allison/AGTSR Interactions", Sy A. Ali, p. 103.

"Proceedings of the Advanced Turbine Systems Annual Program Review Meeting", vol. I, "Design Factors for Stable Lean Premix Combustion", Richards et al., p. 107.

"Proceedings of the Advanced Turbine Systems Annual Program Review Meeting", vol. I, "Ceramic Stationary as Turbine", M. van Roode, p. 114.

"Proceedings of the Advanced Turbine Systems Annual Program Review Meeting", vol. I, "DOE/Allison Ceramic Vane Effort", Wenglarz et al., p. 148.

"Proceedings of the Advanced Turbine Systems Annual Program Review Meeting", vol. I, "Materials/Manufacturing Element of the Advanced Turbine Systems Program", Karnitz et al., p. 152.

"Proceedings of the Advanced Turbine Systems Annual Program Review Meeting", vol. I, "Land–Based Turbine Castings Initiative", Mueller et al., p. 161.

"Proceedings of the Advanced Turbine Systems Annual Program Review Meeting", vol. I, "Pratt & Whitney Thermal Barrier Coatings", Bornstein et al., p. 182.

"Proceedings of the Advanced Turbine Systems Annual Program Review Meeting", vol. I, "Westinhouse Thermal Barrier Coatings", Goedjen et al., p. 194.

"Proceedings of the Advanced Turbine Systems Annual Program Review Meeting", vol. I, "High Performance Steam Development", Duffy et al., p. 200.

"Proceedings of the Advanced Turbine Systems Annual Program Review Meeting", vol. II, "Lean Premixed Combustion Stabilized by Radiation Feedback and heterogeneous Catalysis", Dibble et al., p. 221.

"Proceedings of the Advanced Turbine Systems Annual Program Review Meeting", vol. II, Rayleigh/Raman/LIF Measurements in a Turbulent Lean Premixed Combustor, Nandula et al. p. 233.

"Proceedings of the Advanced Turbine Systems Annual Program Review Meeting", vol. II, "Lean Premixed Flames for Low $No_x$ Combustors", Sojka et al., p. 249.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276.

"Proceedings of the Advanced Turbine Systems Annual Program Review Meeting", vol. II, "Advanced Turbine Cooling, Heat Transfer, and Aerodynamic Studies", Han et al., p. 281.

"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies for Gas Turbine Power Plants", Vandsburger et al., p. 328.

"Proceedings of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371.

"Proceedings of the Advanced Turbine Systems Annual Program Review Meeting", vol. II, "Rotational Effects on Turbine Blade Cooling", Govatzidakia et al., p. 391.

"Proceedings of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting, vol. II", The Role of Reactant Unmixedness, Strain Rate, and Length Scale on Premixed Combustor Performace, Samuelsen et al., p. 415.

"Proceedings of the Advanced Turbine Systems Annual Program Review Meeting", vol. II, "Experimental and Computational Studies of Film Cooling With Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Turbine Systems Annual Program Review Meeting", vol. II, "Use of a Laser–Induced Fluorescence Thermal Imaging System for Film Heat Transfer Measurement", M. K. Chyu, p. 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing, and Flame Structure Issues", Gupta et al., p. 516.

"Proceedings of the Advanced Turbine Systems Annual Program Review Meeting", vol. II, "Intercooler Flow Path for Gas Turbine: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al., p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", "ATS and the Industries of the Future", Denise Swink, p. 1.

"Proceedings of the Advanced Turbine Systems Annual Program Review Meeting", "Gas Turbine Association Agenda", William H. Day, p. 3.

"Proceedings of the Advanced Turbine Systems Annual Program Review Meeting", "Power Needs in the Chemical Industry", Keith Davidson, p. 17.

"Proceedings of the Advanced Turbine Systems Annual Program Review Meeting", "Advanced Turbine Systems Program Overview", David Esbeck, p. 27.

"Proceedings of the Advanced Turbine Systems Annual Program Review Meeting", "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Mehtodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution in Premixed Flames", Ashwani K. Gupta, p. 211.

"Proceedings of the Advanced Turbine Systems Annual Program Review Meeting", "Combustion Instability Studies Application to Land–Based Gas Turbine Combustors", Robert J. Santoro, p. 233.

"Proceedings of the Advanced Turbine Systems Annual Program Review Meeting", Active Control of Combustion Instabilities in Low $NO_x$ Turbines, Ben T. Zinn, p. 253.

"Proceedings of the Advanced Turbine Systems Annual Program Review Meeting", "Life Prediction of Advanced Materials for Gas Turbine Application," Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodynamics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angle Injection", R. Goldstein, p. 447.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine Systems", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advanced Turbine Systems Annual Program Review Meeting", "Land Base Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeting", "Western European Status of Ceramics for Gas Turbines", Tibor Bornemisza, p. 659.

"Proceedings of the Advanced Turbine Systems Annual Program Review Meeting", "Status of Ceramic Gas Turbines in Russia", Mark van Roode, p. 671.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda.

"Testing Program Results Validate GE's H Gas Turbine—High Efficiency, Low Cost of Electricity and Low Emissions", Slide Presentation—working draft.

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1,–Dec. 31, 1996, Publication Date, Jun. 1, 1997, Report Nos. DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos. DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing,", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

METHOD AND APPARATUS FOR FUEL GAS MOISTURIZATION AND HEATING

This is a continuation of application Ser. No. 09/340,510, filed Jul. 1, 1999, abandoned.

This invention was made with Government support under Contract No. DE-FC21-95MC31176 awarded by the Department of Energy. The Government has certain rights in this invention.

BACKGROUND OF THE INVENTION

The present invention relates to natural gas fired combined cycle power plants and, in particular, to a modified bottoming cycle for fuel gas saturation and heating to increase power output and thermodynamic efficiency.

In conventional bottoming cycle Heat Recovery Steam Generators (HRSG) there is a large temperature difference between the hot gas and the cold water in the lower pressure economizer (LP-EC) resulting in thermodynamic exergy (thermodynamic potential) losses which limit the power output in the cycle. Heretofore there have been attempts to design bottoming cycles for better temperature matching in the HRSG, such as the Kalina cycle, which uses a multi-component fluid, e.g., ammonia and water, with non-isothermal boiling characteristics. Such multi-component fluid cycles provide better temperature matching in the entire HRSG and efficiency gains. However, significant practical difficulties exist in using multi-component fluids in bottoming cycles.

Fuel heating is currently implemented in some combined cycle power plants for improving thermal efficiency. Although current fuel heating methods result in plant power output reduction, when heating the fuel above the LP steam temperature, the gain in thermal efficiency as a result of the decreased heat consumption makes fuel heating an economically attractive design option. However, there remains a need for a method and apparatus for achieving a better temperature matching in the HRSG while avoiding power plant output reduction.

BRIEF SUMMARY OF THE INVENTION

The bottoming cycle design method according to a presently preferred embodiment of the present invention results in better temperature matching between the hot and cold heat exchange streams below the lowest pressure evaporator temperature by providing a water heating section for fuel gas saturation in parallel with the lower pressure economizer (LP-EC) in the heat recovery steam generator. Thus, the heat source for fuel gas saturation in the current invention is the gas turbine exhaust gases. The increased gas mass flow due to the addition of moisture results in increased power output from the gas and steam turbines. Fuel gas saturation is followed by superheating the fuel, preferably with bottom cycle heat sources, resulting in a larger thermal efficiency gain compared to current fuel heating methods. There is a gain in power output compared to no fuel heating, even when heating the fuel to above the LP steam temperature. As noted above, current fuel heating methods would result in a power output loss compared to no fuel heating. Thus, fuel gas saturation and subsequent super heating with the cycle of the invention results in increased power output and thermodynamic efficiency compared to a conventional combined cycle with fuel heating to the same temperature or a cycle with no fuel heating. This improved performance is a result of the reduced exergy losses in the HRSG with the modified bottoming cycle described.

The invention is thus embodied in a combined cycle system including a gas turbine, a steam turbine, and a heat recovery steam generator, wherein gas turbine exhaust gas is used in the heat recovery steam generator for generating steam for the steam turbine, said gas turbine exhaust gas flowing from an entry end to an exit end of the heat recovery steam generator, and wherein the system further comprises a fuel gas saturator assembly for saturating fuel gas with water and heating the fuel gas, the heat recovery steam generator (HRSG) including a first water heater for heating water with heat from the exhaust gases, to define a heat source for the fuel gas saturator assembly; and a fuel gas superheater for superheating fuel gas that has been saturated and heated by the fuel gas saturator assembly for supply to the gas turbine.

In one embodiment, the fuel gas saturator assembly comprises a fuel gas saturator packed column, for saturating and heating fuel gas with heated water received from the first water heater of the HRSG. In another embodiment, the fuel gas saturator assembly comprises a water inlet for adding water to the fuel gas and a heat exchanger for heating fuel gas saturated with the water input at the water inlet. In this case, the heat exchanger receives and uses the heated water from the first water heater to heat the fuel gas. Whether a heat exchanger or a saturator column is used, in a preferred embodiment of the invention, the fuel superheater heats the saturated fuel gas using a heat recovery steam generator heat source.

The invention is also embodied in a method for increasing power output and thermodynamic efficiency in a combined cycle system including a gas turbine, a steam turbine, and a heat recovery steam generator, wherein gas turbine exhaust gas is used in the heat recovery steam generator for generating steam for the steam turbine, said gas turbine exhaust gas flowing from an entry end to an exit end of the heat recovery steam generator, the method comprising the steps of adding water to and heating fuel gas to produce heated, saturated fuel gas, the heat being derived from the heat recovery steam generator, feeding the saturated fuel gas to a fuel superheater; further heating the saturated fuel gas in the fuel superheater to superheat the fuel gas; and feeding the superheated, saturated fuel gas to the gas turbine. In a preferred implementation, the saturated fuel gas is also heated with heat derived from a heat source in the heat recovery steam generator.

The herein described modified bottoming cycle and method is applicable in particular to natural gas fire combined cycle applications.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, in which.

DETAILED DESCRIPTION OF THE INVENTION

Figure 1:
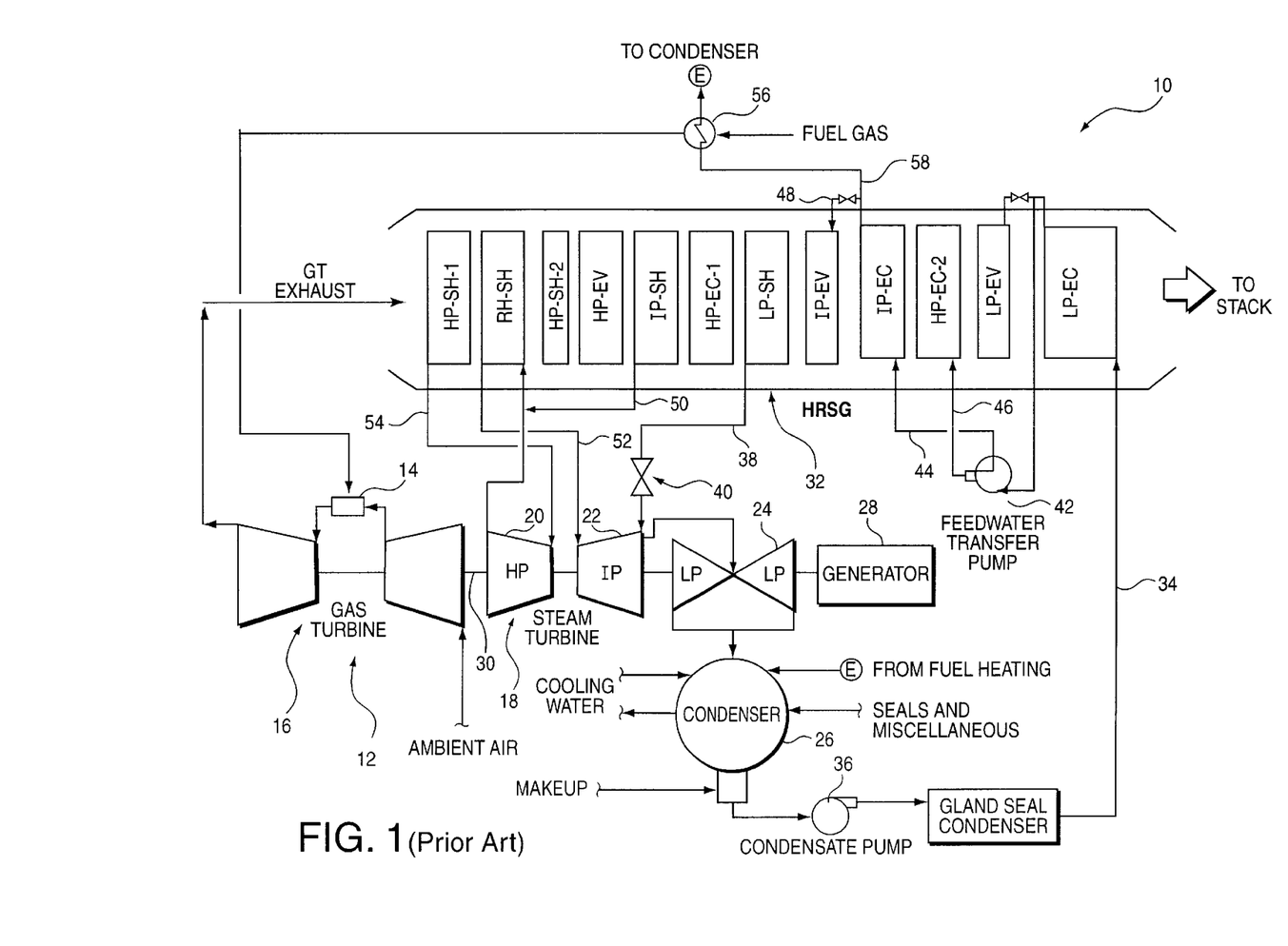
FIG. 1 is a schematic representation of a conventional three pressure re-heat STAG cycle system.

A schematic of a conventional three pressure reheat combined cycle power plant with fuel heating 10 is shown in FIG. 1.

This example includes a gas turbine system 12 comprising a combustion system 14 and a gas turbine 16, and a steam turbine system 18 including a high pressure section 20, an intermediate pressure section 22, and one or more low pressure sections 24 with multiple steam admission points at different pressures. The low pressure section 24 exhausts into a condenser 26. The steam turbine 18 drives the generator 28 which produces electrical power. The gas turbine 12, steam turbine system 18, and generator 28 are arranged in tandem, on a single shaft 30.

The steam turbine system 18 is associated with a multi-pressure HRSG 32 which includes a low pressure economizer (LP-EC), a low pressure evaporator(LP-EV), a high pressure economizer (HP-EC-2), an intermediate pressure economizer (IP-EC), an intermediate pressure evaporator (IP-EV), a low pressure superheater (LP-SH), a final high pressure economizer (HP-EC-1), an intermediate pressure superheater (IP-SH), a high pressure evaporator (HP-EV), a high pressure superheater section (HP-SH-2), a reheater (RH-SH), and a final high pressure superheater section (HP-SH-1).

Condensate is fed from condenser 26 to the HRSG 32 via conduit 34 with the aid of condensate pump 36. The condensate subsequently passes through the LP-EC and into the LP-EV. In a known manner steam from the LP-EV is fed to the LP-SH and then returned to the low pressure section 24 of the steam turbine 18 via conduit 38 and appropriate LP admissions stop/control valve(s) schematically depicted at 40. Feed water with the aid of feed water pump(s) 42 passes (1) through the IP-EC via conduit 44 and to the IP-EV via conduit 48, and (2) through the HP-EC-2 via conduit 46 and then on to the final HP-EC-1 (conduit not shown). At the same time, steam from the IP-EV passes through the IP-SH and then flows through the reheater RH-SH via conduit 50. The reheated steam is returned to the mediate pressure section 22 of the steam turbine 18 via conduit 52.

Meanwhile, condensate in the final HP-EC-1 is passed to the HP-EV. Steam exiting the HP-EV passes through the superheater sections HP-SH-2 and HP-SH-1 and is returned to the high pressure section 20 of the steam turbine 18 by way of conduit 54 and appropriate stop/control valves (if required, not shown).

The source for fuel heater 56 in this example is an extraction 58 from the intermediate pressure economizer (IP-EC) outlet. Extraction from other sections of the HRSG or the steam turbine is also possible. Adding heat to the fuel from a bottom cycle energy source reduces the heat consumption by an amount equal to the heat added, with a corresponding reduction in the fuel gas consumption. Although there is a reduction in the plant net power output due to the use of a bottom cycle energy source for fuel heating, particularly when heating the fuel above the LP steam temperature, the reduction of the heat consumption would result in the increase in the thermodynamic efficiency if an appropriate heat source is selected. While the economical value of the increased thermodynamic efficiency is considerably higher than the cost of the lost power output in most instances, the benefit is nevertheless reduced due to the loss in the power plant output.

By way of illustration, and with reference to the cycle 10 shown in FIG. 1, heating the fuel from 80° F. to 365° F. with the water leaving the exchanger 56 at a temperature of 130° F. results in an increase in combined cycle net efficiency by +0.6%, with a reduction in the net power output of –0.25%.

Figure 2:
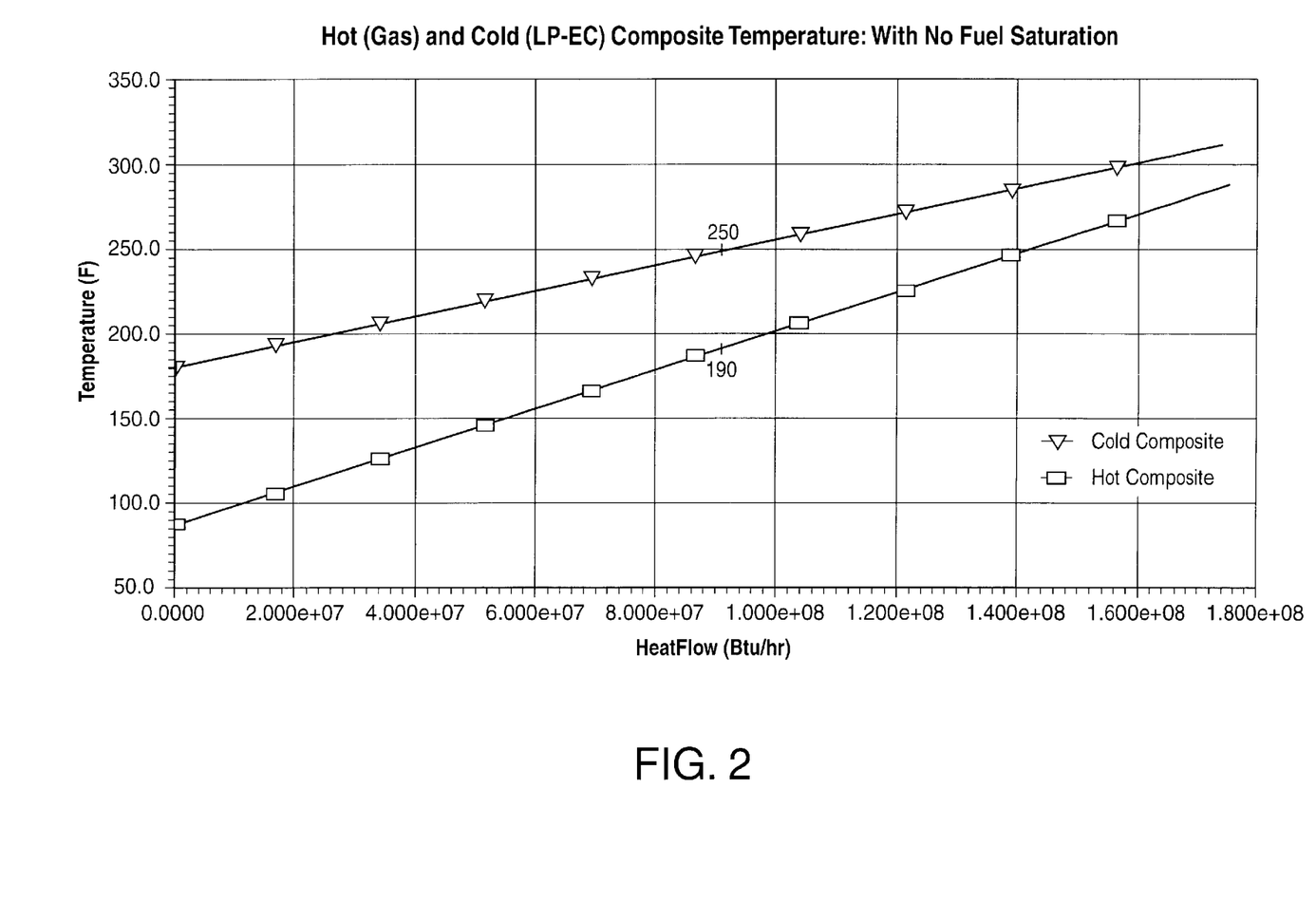
FIG. 2 is a graph showing hot (gas) and cold (LP-EC) composite temperature with no fuel saturation for the system of FIG. 1.

FIG. 2 shows a plot of the heat duty in millions of BTU's per hour versus the corresponding temperature of the hot composite (gas) and the cold composite (boiler feed water), for the LP-EC section of the HRSG 32 in FIG. 1. Gases leaving the low pressure evaporator (LP-EV) and entering the LP-EC are typically between 290–330° F., and 313° F. is used for this example. In this example, a temperature differential of 25° F. exists at the gas inlet to the LP-EC, where the feed water is heated to 288° F., with this temperature mismatch increasing to approximately 60° F. at a gas temperature of 250° F., and further increasing to approximately 100° F. at the LP-EC exit where the gas enters the stack. This temperature mismatch is a source of exergy loss inherent in conventional Rankine bottoming cycles.

Figure 3:
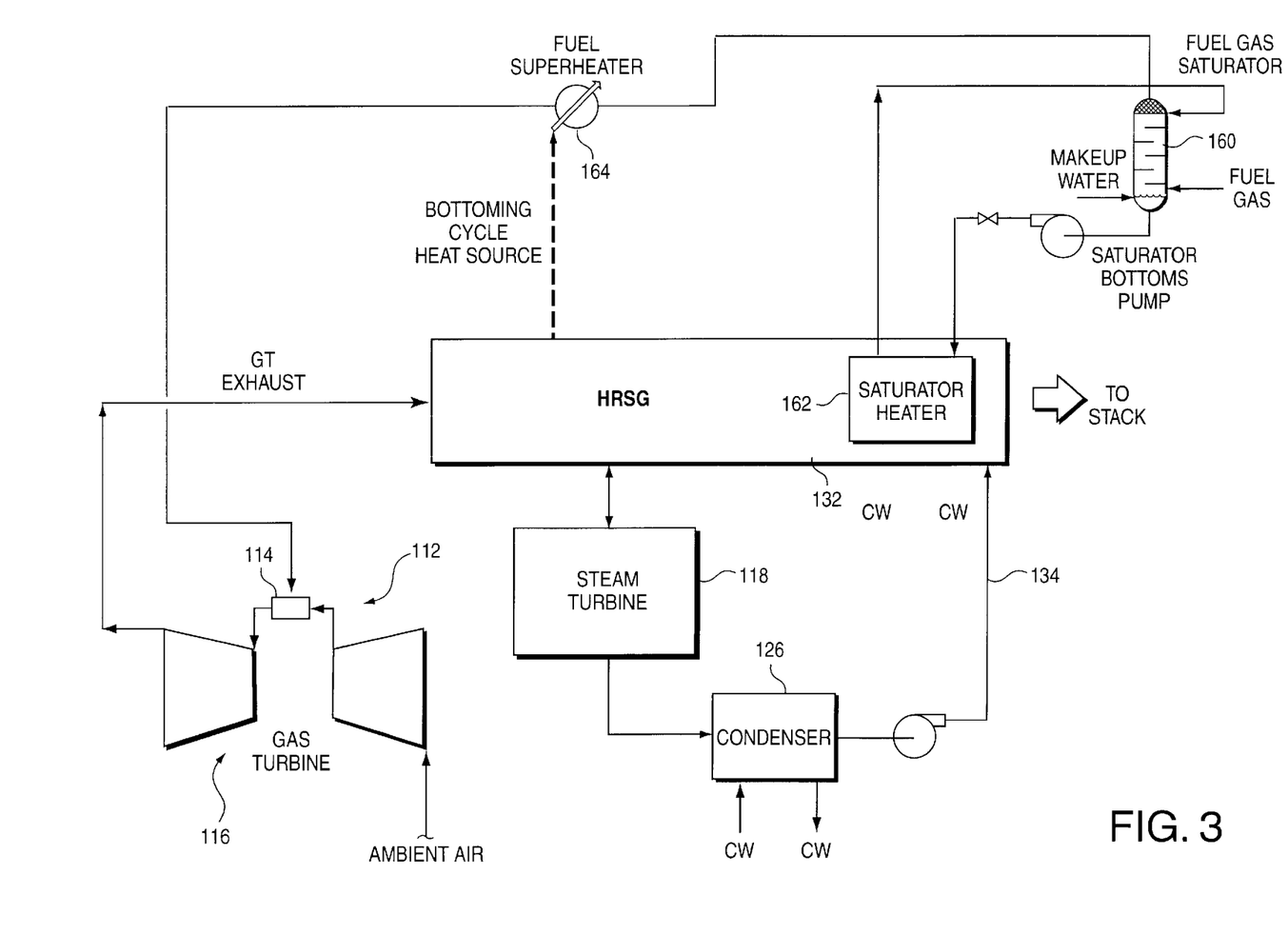
FIG. 3 is a schematic representation of a combined cycle power plant in accordance with the invention.

The basic concept of the invention can be understood with reference to the schematic representation of FIG. 3. For convenience components that correspond to those identified above with reference to FIG. 1 are identified with similar reference numerals but are only discussed in particular as necessary or desirable to an understanding of the fuel saturation and heating components and process.

Fuel gas is sent to a saturator 160, where moisture is absorbed by direct contact with hot water in a packed or trayed column. The saturator bottoms water is heated with gas turbine exhaust gas in the saturator heater 162. The saturator heater 162 is placed in an optimal location relative to other HRSG tube banks which heat the cycle working fluid. Makeup water is provided to the fuel gas saturator 160, to replace the moisture absorbed by the gas. The saturated fuel gas leaving the saturator 160 is further heated in a fuel superheater 164 using, in the illustrated embodiment, a bottoming cycle heat source. The appropriate selection of bottoming cycle heat source(s) for the saturator heater and the fuel superheater results in a performance enhancement for the power cycle.

The addition of moisture to the fuel gas at the fuel gas saturator 160 increases the mass flow of the fuel gas. This increased mass flow increases power output of both the gas and steam turbines. Moreover, the use of low grade energy, which would not be useful for steam production, to introduce moisture and thus increase mass flow to the fuel, results in the gain in thermodynamic efficiency. This is also reflected as a reduction of the temperature mismatch in the HRSG below the LP-EV gas exit temperature and a corresponding decrease in thermodynamic exergy losses in the HRSG section.

Figure 4:
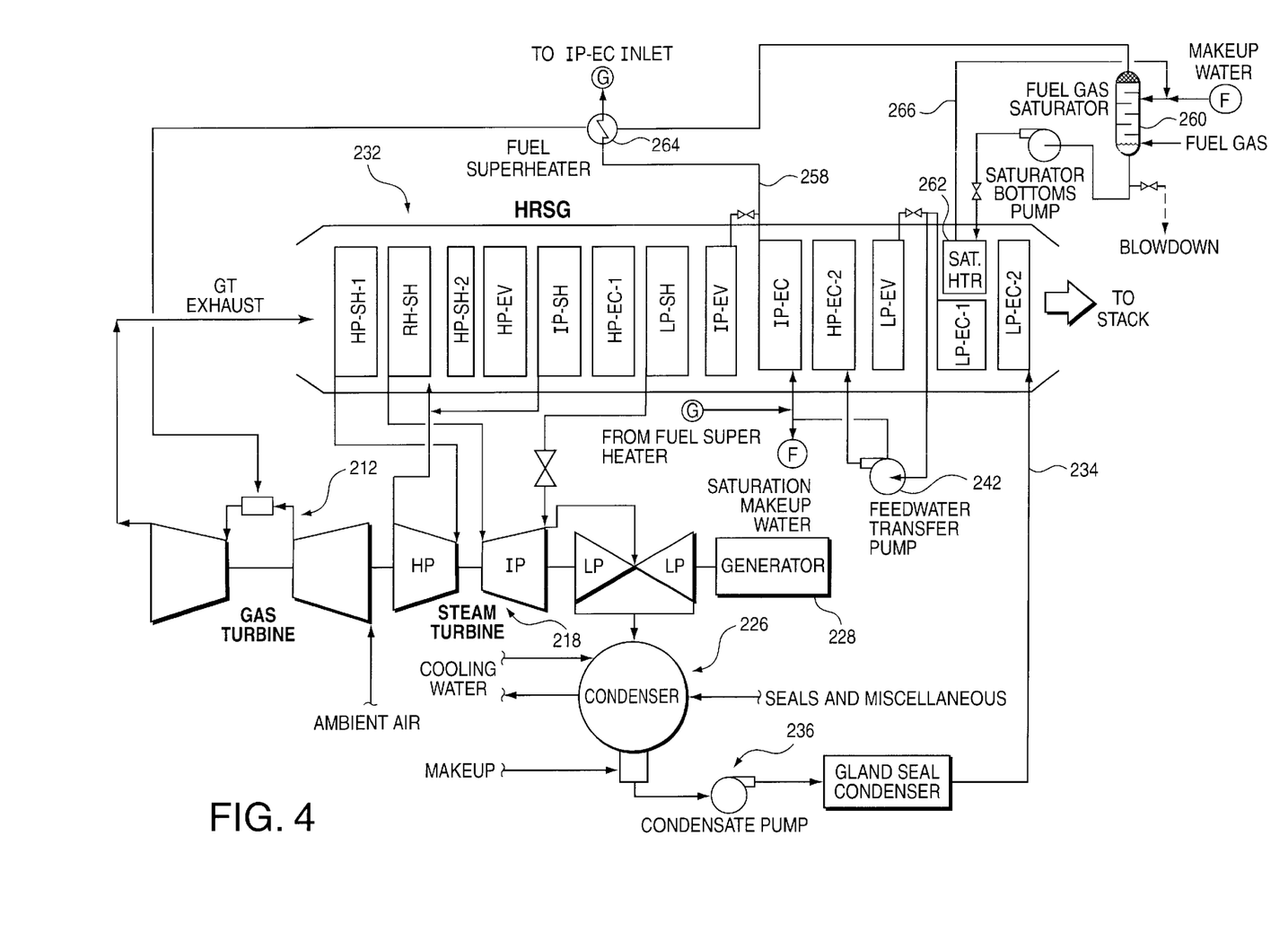
FIG. 4 is a more detailed schematic representation of a three pressure re-heat STAG cycle with fuel gas saturation in accordance with one embodiment of the invention.

By way of example, a first preferred implementation of the foregoing concept for a three pressure reheat Combined Cycle Power Plant is shown in FIG. 4. Again, for convenience, components that correspond to those identified above with reference to FIGS. 1 and/or 2 are identified with similar reference numerals but are only discussed in particular as necessary or desirable to an understanding of the fuel saturation and heating components and process.

In the embodiment of FIG. 4, a section of the low pressure economizer (LP-EC) has been modified by placing a fuel saturator water heating coil section (SAT.HTR) 262 in parallel with an economizer section (LP-EC-1). This modification results in the reduction of the temperature mismatch and exergy loss in the HRSG 232 below the LP-EV gas exit temperature, and a corresponding efficiency enhancement with fuel saturation. While in the illustrated embodiment of saturator heater is shown in parallel to the LP-EC-1, it could, for example, be arranged in an intertwined arrangement with the LP-EC-1, or placed at other locations in the HRSG.

The heated saturator water is sent to saturator 260 via conduit 266, where moisture is absorbed by the fuel gas by direct contact with the hot saturator water. The saturator bottoms water is returned to the saturator water heater 262, e.g., with the aid of a saturator bottoms pump 268. Makeup water is provided, for example, from the feed water pump 242 output as shown at F, to the fuel gas saturator 260, to replace the moisture absorbed by the gas. Although makeup water for fuel saturation is shown as taken from the feed water transfer pump 242 discharge and/or from the fuel superheater 264, the saturator water (saturator makeup) could be taken from any other location in the cycle, or from an outside source. Thus, the illustrated source(s) are not to be limiting in this regard.

The saturated fuel gas leaving the saturator 260 is further heated in fuel superheater 264, preferably using a bottoming cycle heat source. The heating source for the fuel superheating in this example is IP-EC discharge water, via conduit 258, but other heat sources could be used. In the embodiment of FIG. 4, the IP-EC discharge water is returned to the IP-EC as shown at G and/or is used as makeup water for fuel saturation, as mentioned above.

As an illustration, with the gas turbine and ambient conditions identical to those used for the example depicted in FIGS. 1 and 2, the proposed system design shown in FIG. 4 results in a +1.0% gain in combined cycle net efficiency, and a +0.9% gain in combined cycle net output. In this example, the gas leaves the LP-EV at 313° F. and the saturator bottoms water is heated to 298° F. in the saturator heater (SAT.HTR) which is placed, as noted above, in parallel with LP-EC-1. The boiler feed water is heated to 288° F. in LP-EC-1&2 as in the previous example.

Fuel gas (100% Methane, $CH_4$) enters the fuel gas saturator at a pressure of 400 psia and a temperature of 80° F. The fuel gas leaves the saturator at 284° F. saturated with water vapor. The saturated fuel gas leaving the gas saturator has a composition of approximately 86%v $CH_4$ and 14%v $H_2O$. The saturated fuel gas is subsequently superheated to 365° F. in the fuel superheating heat exchanger 264.

Figure 5:
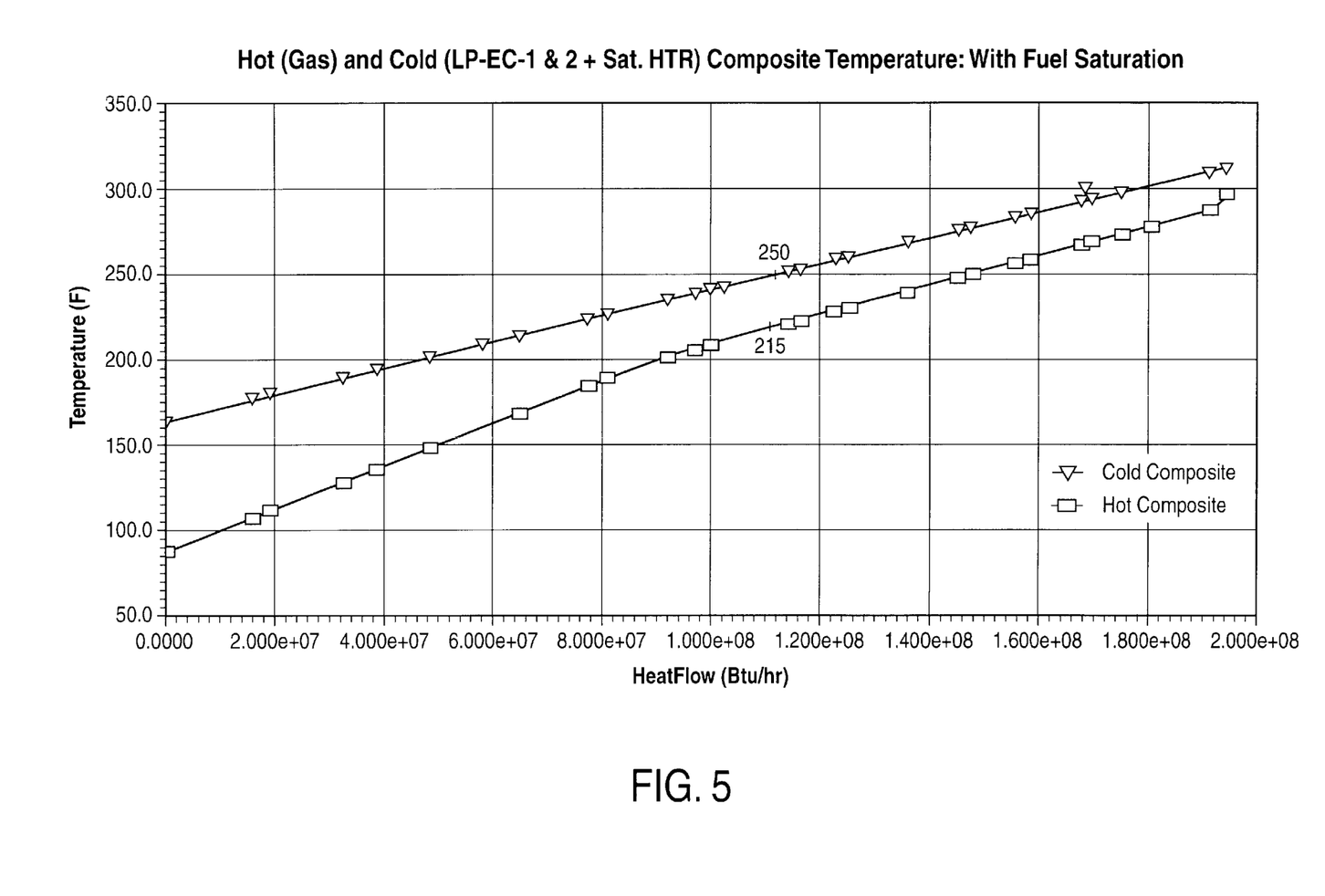
FIG. 5 is a graph of hot (gas) and cold (LP-EC-1 & 2+SAT.HTR) composite temperature with fuel saturation in accordance with the first embodiment of the invention.

FIG. 5 shows the plot of heat duty in millions of BTUs per hour versus the corresponding temperature of the hot composite (gas) and the cold composite (boiler feed water heating, and saturator bottoms water heating) for the HRSG section LP-EC-1&2 and the saturator heater, for the system shown in FIG. 4. In this example, a temperature differential of 15° F. exists at the gas inlet to the HRSG sections after the LP-EV, with the temperature differential increasing to approximately 35° F. at a gas temperature of 250° F. and further increasing to 80° F. at the HRSG exit. The proposed cycle design of FIG. 4 has us resulted in a substantial reduction of the temperature mismatch (and exergy losses) in this example for gas temperatures between 313° F. and approximately 240° F., and a smaller reduction in the temperature mismatch at lower gas temperatures.

As noted above, the heat source for fuel superheating after saturation could be an extraction from other points in the HRSG or the Steam Turbine. Further, while in the example of FIG. 4, water leaving the fuel superheater is returned to the IP-EC, that water could be admitted to any other appropriate location in the bottoming cycle, or to the fuel saturator as makeup water.

Figure 6:
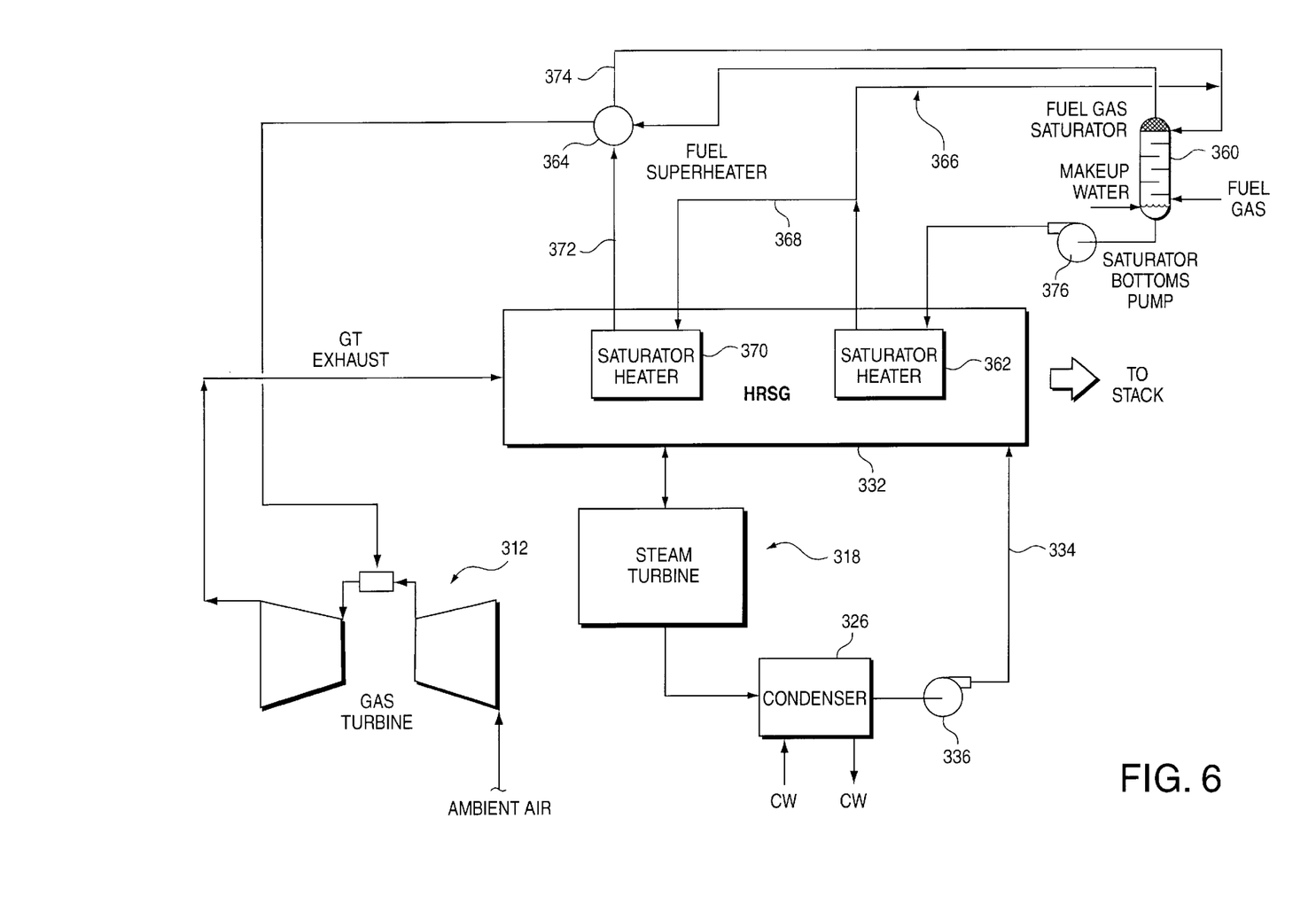
FIG. 6 is a schematic representation of a combined cycle power plant with fuel gas saturation and integrated fuel superheater in accordance with another implementation of the invention.

FIG. 6 is a further illustrative embodiment of the invention, in which the saturated fuel gas leaving the saturator 360 is superheated using the saturator bottoms liquid rather than cycle working fluid as in the embodiment of FIG. 4. As illustrated, the saturator bottoms liquid is initially heated in the heat exchanger 362 with heat from the HRSG exhaust gases. An extraction 368 from the outlet of heat exchanger 362 is sent to heat exchanger 370 for further heating. As illustrated, heat exchanger 370 is placed upstream of heat exchanger 362 in the HRSG 332. Both saturator heaters 362 and 370 are placed in an optimal location relative to other HRSG tube banks which heat the cycle working fluid. The outlet 372 from heater 370 is used as the heat source for superheating the saturated fuel gas in heat exchanger 364. The outlet liquid stream 374 from heater 364 is admitted to the fuel gas saturator 360 after being rejoined with the other flow 376 from the outlet of heat exchanger 362, for direct contact heat and mass transfer with the fuel gas.

The apparatus and method of superheating the saturated fuel gas shown in FIG. 6 provides a performance benefit due to additional moisture absorption by the gas, and increased safety in the system. The increased safety of this system is due to the elimination of the potential of fuel gas mixing with the cycle working fluid, which is a potential safety hazard when using cycle working fluid as the heat source for at exchange with the fuel gas.

The saturator bottoms pump 376 of FIG. 6, and the like pumps illustrated in FIGS. 3 and 4, may be located at other positions in the system and additional pumps may be added to the system depicted. Heater 370 may be eliminated from the system for some cycle designs with the extraction from the outlet of heater 362 sent directly to heater 364. Furthermore, although not illustrated in particular, the saturation water (saturator make-up, or saturator bottoms) in any of the illustrated embodiments could be heated with low grade heat sources available in the cycle, such as lube oil heat, which are normally rejected to cooling water. This would result in a further performance enhancement to the proposed cycle.

Figure 7:
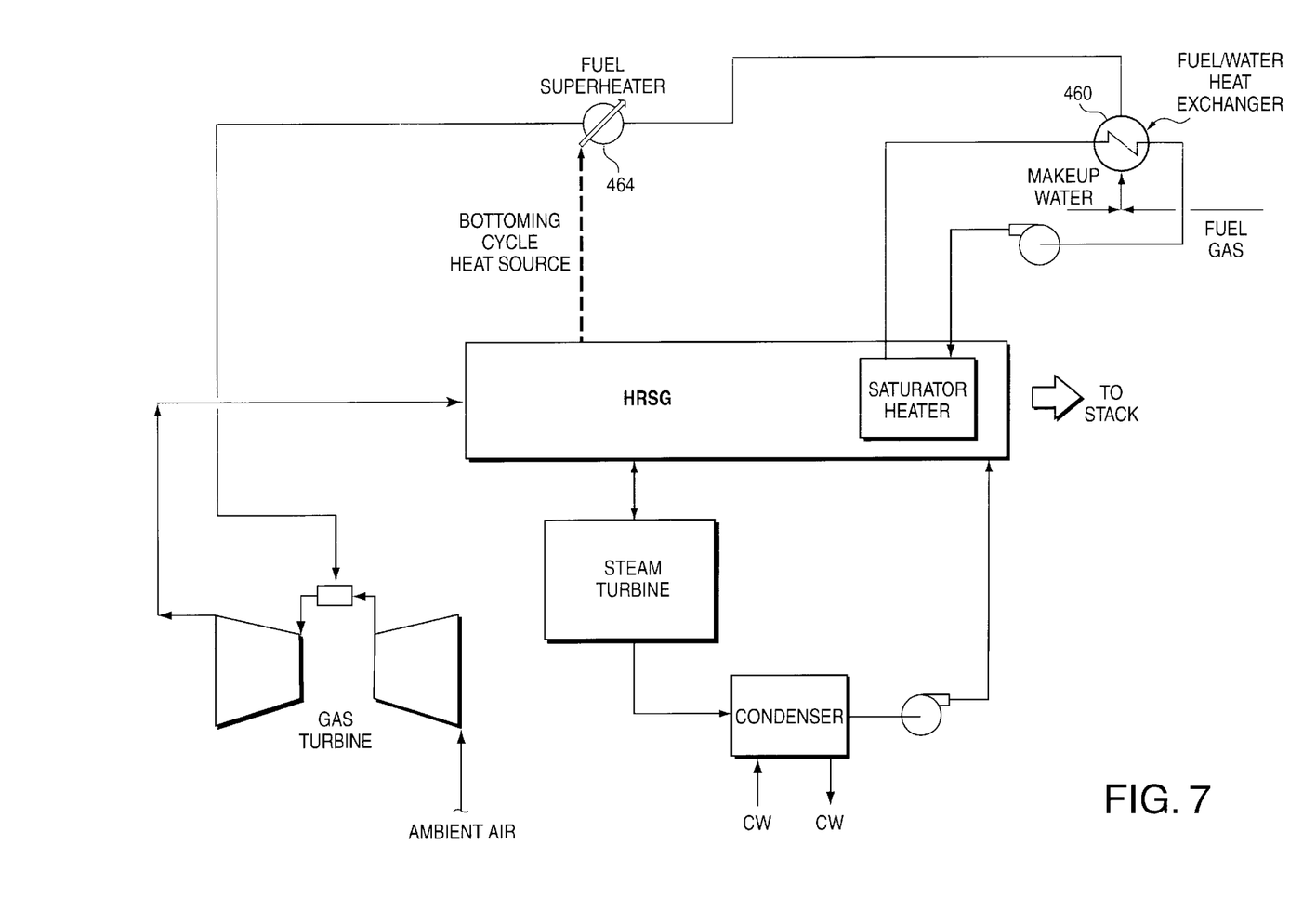
FIG. 7 is a schematic representation of a combined cycle power plant with fuel gas saturation and integrated fuel superheater in accordance with yet another implementation of the invention.

As described above with reference to e.g., FIG. 3, the fuel gas saturator assembly for adding water to and heating the fuel gas may be a saturator packed column. As an alternative, the saturator packed column shown in FIG. 3 could be replaced by the combination of a water input and a fuel/water heat exchanger, as shown in FIG. 7, while obtaining similar thermodynamic benefits of moisturizing the fuel. The choice of device (packed column or heat exchanger) would be determined by the heat and mass transfer effectiveness of the device, and the overall power plant economics. In FIG. 7, the makeup water is sprayed into the fuel gas at the inlet to the heat exchanger (water atomization for spraying would be either using a pressure atomized nozzle, air atomized nozzle, or steam atomized. If steam or air atomized configurations are used it would be extracted from the cycle.). The two phase fuel/water mixture is heated in heat exchanger 460 using heat extracted from an optimum HRSG location as shown in FIG. 7, with a closed loop system. The saturated fuel gas leaving heat exchanger 460 is further superheated in heat exchanger 464 prior to entering the gas turbine combustor. The system otherwise generally corresponds to the other embodiments described hereinabove.

As will be appreciated, the invention can be applied to a single pressure or multi-pressure combined cycle power generation system with or without reheat.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined cycle system including a gas turbine, a steam turbine, and a heat recovery steam generator, wherein gas turbine exhaust gas is used in the heat recovery steam generator for generating steam for the steam turbine, said gas turbine exhaust gas flowing from an entry end to an exit end of the heat recovery steam generator, and wherein the system further comprises:
  a fuel gas saturator having an inlet for hot saturator water, an inlet for fuel gas, an outlet for saturated fuel gas, and a saturator water outlet;
  a saturator water heater;
  a flow path for flowing saturator water from said saturator water outlet to said saturator heater, said saturator heater being operatively coupled to a heat source in the heat recovery steam generator for heating saturator water conducted thereto, using said heat source, to produce hot saturator water;
  a flow path for flowing hot saturator water produced by the saturator heater to the hot saturator water inlet of the fuel gas saturator;
  a fuel superheater for heating said saturated fuel gas;
  a flow path for flowing saturated fuel gas from said saturated fuel gas outlet to said fuel superheater for heating said saturated fuel gas, to produce superheated, saturated fuel gas; and
  a flow path for flowing said superheated, saturated fuel gas to said gas turbine.

2. A combined cycle system according to claim 1, wherein said fuel superheater is operatively coupled to a heat source in the heat recovery steam generator, for heating said saturated fuel gas using said heat source.

3. A combined cycle system according to claim 2, wherein said saturator heater is operatively coupled to a first portion of the heat recovery steam generator, said fuel superheater is operatively coupled to a second portion of the heat recovery steam generator, and wherein said second portion is upstream of said first portion with respect to a flow direction of said gas turbine exhaust through the heat recovery steam generator.

4. A combined cycle system according to claim 1, wherein said heat recovery steam generator includes a low pressure evaporator and wherein said heat source is downstream of said low pressure evaporator with respect to a flow direction of said gas turbine exhaust through the heat recovery steam generator.

5. A combined cycle system according to claim 3, wherein said heat recovery steam generator includes a low pressure evaporator, said first portion of the heat recovery steam generator is downstream of said low pressure evaporator with respect to a flow direction of said gas turbine exhaust through the heat recovery steam generator, and said second portion of the heat recovery steam generator is upstream of said low pressure evaporator.

6. A combined cycle system according to claim 1, further comprising an input for adding make up water from a make up water source to said saturator water for replacing moisture absorbed by the fuel gas.

7. A combined cycle system according to claim 6, wherein said input for adding make up water comprises a make up water inlet in said fuel gas saturator.

8. A combined cycle system according to claim 6, wherein said heat recovery steam generator includes at least one feed water transfer pump for pumping feed water therethrough, and said input for adding make up water includes a flow path for directing at least a portion of a feed water output from said feed water transfer pump to said fuel gas saturator.

9. A combined cycle system according to claim 1, wherein at least a portion of the water heated by the saturator heater is diverted to the fuel superheater for heating the saturated fuel.

10. A combined cycle system according to claim 9, wherein the heat source for said saturator heater is a different heat source than the heat source for said fuel superheater.

11. A combined cycle system according to claim 1, wherein said saturator heater comprises a heat exchanger for heating said saturator water with heat from said gas turbine exhaust, said heat exchanger being disposed in parallel to a low pressure economizer structure in said heat recovery steam generator.

12. A reheat cycle configuration for a steam turbine and gas turbine combined cycle system comprising:
  a steam turbine connected to a load,
  a condenser for receiving exhaust steam from the steam turbine and condensing said exhaust steam to water;
  a heat recovery steam generator for receiving water from said condenser and converting said water to steam for return to said steam turbine;
  at least one gas turbine for supplying heat to said heat recovery steam generator in the form of exhaust gases;
  a fuel gas saturator assembly for saturating fuel gas with water and heating said fuel gas;
  said heat recovery steam generator including a first water heater for heating water with heat from said exhaust gases, to define a heat source for water for said fuel gas saturator assembly; and
  a fuel gas superheater for superheating fuel gas that has been saturated and heated by said fuel gas saturator assembly for supply to said gas turbine.

13. A reheat cycle configuration according to claim 12, wherein said a fuel gas saturator assembly comprises a water inlet for adding water to a fuel gas supply for said gas turbine and a heat exchanger for heating fuel gas saturated with water input at said water inlet; said heat exchanger receiving heated water from said first water heater.

14. A reheat cycle configuration according to claim 12, wherein said fuel gas saturator assembly comprises a fuel gas saturator packed column having an inlet for hot water from said first water heater, an inlet for fuel gas, an outlet for saturated fuel gas, and a water outlet.

15. A reheat cycle configuration according to claim 12, wherein said fuel gas superheater heats said saturated fuel gas with heat derived from said heat recovery steam generator.

16. A reheat cycle configuration according to claim 12, wherein at least a portion of the water heated by the first water heater is diverted to the fuel superheater for superheating the saturated fuel and wherein saturator water output from said fuel superheater is used to heat said fuel gas in said fuel gas saturator assembly.

17. A reheat cycle configuration according to claim 16, wherein said heat recovery steam generator includes a second water heater for heating said water diverted from said first water heater for input to said fuel superheater.

18. A reheat cycle configuration according to claim 12, wherein said first water heater is disposed in parallel to a low pressure economizer structure in said heat recovery steam generator.

19. A method for increasing power output and thermodynamic efficiency in a combined cycle system including a gas turbine, a steam turbine, and a heat recovery steam generator, wherein gas turbine exhaust gas is used in the heat recovery steam generator for generating steam for the steam turbine, said gas turbine exhaust gas flowing from an entry end to an exit end of the heat recovery steam generator, the method comprising the steps of:

adding water to and heating fuel gas to produce heated, saturated fuel gas, said fuel gas being heated with water heated by the heat recovery steam generator;

feeding the saturated fuel gas to a fuel superheater;

further heating the saturated fuel gas in the fuel superheater to superheat the fuel gas; and feeding the superheated, saturated fuel gas to the gas turbine.

20. A method as in claim 19, wherein said saturated fuel gas is superheated with heat derived from a heat source in the heat recovery steam generator.

21. A method as in claim 19, wherein said fuel gas is saturated and heated in a fuel gas saturator packed column having an inlet for hot saturator water heated by the heat recovery steam generator, an inlet for fuel gas, an outlet for heated, saturated fuel gas, and a water outlet.

22. A method as in claim 21, wherein at least a portion of said hot saturator water is diverted to said fuel superheater before being fed to said saturator.

23. A method as in claim 21, wherein the saturator water is heated in a heat exchanger disposed downstream of a low pressure evaporator with respect to a flow direction of said gas turbine exhaust through the heat recovery steam generator.

24. A reheat cycle configuration according to claim 12, wherein said heat recovery steam generator includes low pressure evaporator, and wherein said first water heater comprises a heat exchanger disposed downstream of said low pressure evaporator with respect to a flow direction of said gas turbine exhaust through the heat recovery steam generator.

* * * * *